Patented July 12, 1949

2,475,674

UNITED STATES PATENT OFFICE 2,475,674

DICYANDIAMIDE HYDROCHLORIDE

Joseph H. Paden and Alexander F. MacLean, Stamford, Conn., assignors to American Cyanamid Company, New York, N. Y., a corporation of Maine No Drawing. Application October 25, 1945, Serial No. 624,575

12 Claims. (Cl. 23—87)

This invention relates to the hydrochloride salts of dicyandiamide and to methods of preparing the same.

It has been recorded in the literature that dicyandiamide, a neutral compound having a low ionization constant would not form salts with acids in aqueous solution. In spite of this argument which refutes the formation of such salts, it has now been discovered that hydrochloride salts of dicyandiamide can be prepared.

The hydrochloride salts of dicyandiamide can be prepared either in anhydrous or in aqueous media. However, if an aqueous medium is used as a solvent, the amount of concentrated hydrochloric acid must be increased over the theoretical molar requirements so that the product may be isolated.

The hydrochloride salts of dicyandiamide are not completely stable. The anhydrous solid salts slowly decompose to dicyandiamide and hydrogen chloride and if moisture is present the dicyandiamide is slowly hydrolyzed so that guanylurea hydrochloride is the final decomposition product.

The hydrochloride salts of dicyandiamide are soluble in water and rapidly dissociate to dicyandiamide and hydrochloric acid. However, if a basic material is not present to neutralize the hydrochloride acid as it is formed, the dicyandiamide is hydrolyzed to guanylurea.

If dicyandiamide hydrochloride salts are to be obtained when prepared in the presence of water, an excess of concentrated hydrochloric acid over the theoretical molar requirements is necessary in the reaction mixture. There is an equilibrium in aqueous media between dicyandiamide hydrochlorides and both dicyandiamide and hydrochloric acid. In the absence of any excess hydrochloric acid no dicyandiamide salt crystallizes, but instead a strongly acidic solution is formed. Since dicyandiamide hydrolyzes to guanylurea in acid solution, the final result is the hydrolysis of the dicyandiamide hydrochloride to guanylurea hydrochloride.

Therefore, by increasing the amount of hydrochloric acid over the theoretical molar quantities required in the reaction mixture the solubility product is reached and the equilibrium is forced in the direction not only to yield a maximum amount of dicyandiamide hydrochloride, but also to leave a minimum amount of free dicyandiamide in solution susceptible to hydrolysis. By the use of excess concentrated hydrochloric acid the solubility product of the hydrochloride salts of dicyandiamide is reached so that they crystallize more completely.

By using anhydrous solvents for the dicyandiamide an excess of dry hydrogen chloride over the required molar quantities is unnecessary because of the low solubility of the dicyandiamide hydrochlorides in these solvents. The yields are also improved because of the absence of hydrolysis.

It has been found that dicyandiamide will form both a monohydrochloride and a dihydrochloride salt and that either can be prepared from the other under suitable conditions. Both hydrochloride salts decompose on heating and slowly in the presence of moist air at room temperature.

The following examples will serve to illustrate the preparation of these hydrochloride salts of dicyandiamide:

EXAMPLE 1

*Preparation of dicyandiamide dihydrochloride*

| Reactants | Molar Ratio |
|---|---|
| Dicyandiamide | 1 |
| HCl 37%, aqueous | 4 |

The dicyandiamide is carefully mixed with one-half of the required concentrated HCl. After the reaction mixture is cooled to 5° C., the remainder of the concentrated HCl is added with care. The mixing of the reactants should be at such a rate that detrimental hydrolytic action will not result, and this may be minimized by cooling.

A dense crystalline solid forms upon completion of the addition of concentrated HCl. This colorless solid, dicyandiamide dihydrochloride, is filtered, washed with methyl ethyl ketone and dried in a vacuum at 40° C. By means of a potentiometric titration the molecular weight was found to agree closely with the theoretical value of 157.

Dicyandiamide dihydrochloride does not have a sharp melting point, and since analytical data checks the theoretical composition, the optical and crystallographic properties are herein presented in order to characterize the dihydrochloride. Dicyandiamide dihydrochloride is a white, tabular solid which crystallizes in the orthorhombic system, has the forms (100)(010) (001)(hko)(hol), has the cleavage (001)(010) (100), and has a positive optic sign. It is to be understood that the crystallographic symbols "$h$" and "$k$" are used in conjunction with the letters "$o$" and "$l$" and not with the numerals zero and one. In white light the refractive index, $\beta$, is 1.608. The true optic axial angle is estimated to be 70°–80°. The optic axial plane or principal optic section is (001), and the crystal has as a twin plane (hko). The principal vibration directions are such that $\alpha$ is parallel to "b"; $\beta$ is parallel to "c"; $\delta$ is parallel to "a". It is to be understood that "a," "b," and "c" are the crystallographic axes.

EXAMPLE 2

*Preparation of dicyandiamide monohydrochloride*

| Reactants | Molar Ratio |
|---|---|
| Dicyandiamide dihydrochloride | 1 |
| Dicyandiamide | 1 |

The reactants are mixed in sufficient glacial acetic acid so that the reaction mixture can be stirred easily. After maintaining for one hour at from 20° C. to 30° C., the colorless crystals which form as a result of the reaction are filtered, washed with methyl ethyl ketone, and dried under vacuum at 50° C.

By means of a potentiometric titration of a freshly prepared sample the observed molecular weight was found to agree closely with the theoretical molecular weight of 120.5. Dicyandiamide monohydrochloride does not have a sharp melting or decomposition point, and since analytical data checks the theoretical composition, the optical and crystallographic properties are herein presented in order to characterize the monohydrochloride. Dicyandiamide monohydrochloride is a white tabular solid which crystallizes in the orthorhombic system, has the forms (001) (010) (hol) (hko), and has a negative optic sign. It is to be understood that the crystallographic symbols "h" and "k" are used in conjunction with the letters "o" and "l" and not with the numerals zero and one. The refractive indices in white light are as follows: $\alpha = 1.620$; $\beta = 1.645$; and $\delta = 1.663$. The apparent optic axial angle as observed in air is greater than 100°, and the true optic axial angle estimated therefrom is greater than 60°. The optic axial plane or principal optic section is (010). The principal vibration directions are such that $\alpha$ is parallel to "c"; $\beta$ is parallel to "b"; and $\delta$ is parallel to "a". It is to be understood that "a," "b," and "c" are the crystallographic axes.

EXAMPLE 3

*Preparation of dicyandiamide monohydrochloride*

| Reactants | Molar Ratio |
|---|---|
| Dicyandiamide | 1 |
| Hydrogen chloride, anhydrous | 1 |
| Acetic acid, glacial | 6 |

A suspension of the dicyandiamide in the glacial acetic acid is stirred mechanically while the anhydrous hydrogen chloride is bubbled slowly into the reaction mixture at 25° C. After the addition of the hydrogen chloride is complete, the reaction mixture is stirred at 25° C. for about 30–60 minutes. The colorless dicyandiamide monohydrochloride crystals may then be filtered, washed with ether and dried under vacuum. The properties of this product are the same as those obtained for the dicyandiamide monohydrochloride prepared according to Example 2.

The hydrochloride salts of dicyandiamide are useful as chemical intermediates in the preparation of flame proofing compositions, chemotherapeutic agents, insecticides, synthetic resins and for other purposes.

While the invention has been described with particular reference to specific embodiments, it is to be understood that it is not to be limited thereto but is to be construed broadly and restricted solely by the scope of the appended claims.

What is claimed:

1. A method of preparing dicyandiamide hydrochloride which includes the step of reacting dicyandiamide with not more than four molar ratios of hydrochloric acid selected from the group consisting of substantially anhydrous gaseous hydrochloric acid and a concentrated solution containing excess hydrochloric acid over the theoretical amount required to react with the dicyandiamide, substantially below 50° C., said dicyandiamide when contacted with gaseous hydrochloric acid being in the form of a slurry suspended in a non-aqueous medium, and recovering the dicyandiamide hydrochloride directly as a solid reaction product.

2. A method of preparing a dicyandiamide monohydrochloride which includes the step of reacting an anhydrous slurry of dicyandiamide with not more than two molar ratios of anhydrous hydrochloric acid, substantially below 50° C., and recovering the dicyandiamide monohydrochloride directly as a solid reaction product.

3. A method of preparing dicyandiamide monohydrochloride which includes the step of reacting dicyandiamide with anhydrous hydrogen chloride in an anhydrous solvent for the dicyandiamide below substantially 50° C., and recovering the dicyandiamide monohydrochloride.

4. A method of preparing dicyandiamide monohydrochloride which includes the step of reacting dicyandiamide with an anhydrous slurry of dicyandiamide dihydrochloride below substantially 50° C., and recovering the dicyandiamide monohydrochloride directly as a solid reaction product.

5. A method of preparing a dicyandiamide monohydrochloride which includes the step of reacting dicyandiamide with dicyandiamide dihydrochloride in a substantially 1:1 molar ratio and in an anhydrous solvent for the dicyandiamide below substantially 50° C., and recovering the dicyandiamide monohydrochloride.

6. A method of preparing dicyandiamide dihydrochloride which includes the step of reacting dicyandiamide with concentrated hydrochloric acid below substantially 50° C., and in the presence of an excess of concentrated hydrochloric acid over the theoretical amount required to react with the dicyandiamide used, but not over four molar ratios thereof, and recovering the dicyandiamide dihydrochloride directly as a solid reaction product.

7. A method of preparing dicyandiamide monohydrochloride which includes the steps of reacting in glacial acetic acid dicyandiamide with anhydrous hydrogen chloride in substantially a 1:1 molar ratio and below substantially 50° C., and recovering the dicyandiamide monohydrochloride.

8. A method of preparing dicyandiamide monohydrochloride which includes the steps of reacting in glacial acetic acid dicyandiamide dihydrochloride with dicyandiamide in substantially a 1:1 molar ratio below substantially 50° C., and recovering the dicyandiamide monohydrochloride.

9. A method of preparing dicyandiamide dihydrochloride which includes the steps of reacting dicyandiamide with concentrated hydrochloric acid in a molar ratio of substantially 1:4 below substantially 50° C., and recovering the dicyandiamide dihydrochloride directly as a solid reaction product.

10. Dicyandiamide hydrochloride having the formula

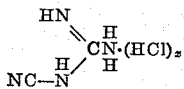

where $x$ is an integer not exceeding 2, produced by a reaction of the group consisting of the reactions stated in claim 1, and being a white solid crystallizing in the orthorhombic system.

11. Dicyandiamide monohydrochloride having the formula

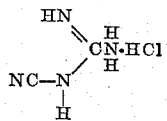

produced by the reaction of claim 2 and being a white solid crystallizing in the orthorhombic system.

12. Dicyandiamide dihydrochloride having the formula

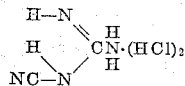

produced by the reaction of claim 6 and being a white solid crystallizing in the orthorhombic system.

JOSEPH H. PADEN.
ALEXANDER F. MacLEAN.

REFERENCES CITED

The following references are of record in the file of this patent:

UNITED STATES PATENTS

| Number | Name | Date |
|---|---|---|
| 1,618,504 | Barsky | Feb. 22, 1927 |
| 2,184,883 | Muskat et al. | Dec. 26, 1939 |

FOREIGN PATENTS

| Number | Country | Date |
|---|---|---|
| 17,507 | Great Britain | 1902 |

OTHER REFERENCES

Von Wohler, et al., Annalen der Chemie & Pharmacie, Bande 122, 1862, pp. 27 and 28.

Pranke, Cyanamid, Chem. Publishing Co., Easton, Pa. (1913), p. 18.